(12) United States Patent
Adam et al.

(10) Patent No.: US 9,453,562 B2
(45) Date of Patent: Sep. 27, 2016

(54) VALVE ACTUATOR TORQUE LIMITER

(75) Inventors: Stuart Steven Adam, Frome (GB); Kevin Richard Sweet, Pensford (GB)

(73) Assignee: ROTORK CONTROLS LIMITED, Bath (GB)

(*) Notice: Subject to any disclaimer, the term of this patent is extended or adjusted under 35 U.S.C. 154(b) by 51 days.

(21) Appl. No.: 14/361,006

(22) PCT Filed: Nov. 28, 2011

(86) PCT No.: PCT/GB2011/052340
§ 371 (c)(1),
(2), (4) Date: Aug. 5, 2014

(87) PCT Pub. No.: WO2013/079891
PCT Pub. Date: Jun. 6, 2013

(65) Prior Publication Data
US 2014/0338478 A1    Nov. 20, 2014

(51) Int. Cl.
*F16K 31/05* (2006.01)
*F16H 19/02* (2006.01)
*F16D 43/21* (2006.01)
*F16H 35/10* (2006.01)
*F16K 31/04* (2006.01)
*F16D 55/00* (2006.01)
*F16H 35/00* (2006.01)

(52) U.S. Cl.
CPC ............ *F16H 19/02* (2013.01); *F16D 43/215* (2013.01); *F16D 55/00* (2013.01); *F16H 35/10* (2013.01); *F16K 31/048* (2013.01); *F16K 31/05* (2013.01); *F16H 2035/006* (2013.01); *Y10T 74/18568* (2015.01); *Y10T 74/18792* (2015.01)

(58) Field of Classification Search
CPC .... F16K 31/05; F16K 31/055; F16D 43/215; Y10T 74/18792; Y10T 74/18616
USPC ....... 251/129.11, 129.12, 129.13, 249.5, 288
See application file for complete search history.

(56) References Cited

U.S. PATENT DOCUMENTS 3,994,178 A * 11/1976 Hore ...................... F16H 35/10
                                                    188/134
4,064,973 A * 12/1977 Deem .................. F16D 65/567
                                                    188/196 C (Continued)

FOREIGN PATENT DOCUMENTS

GB          1 446 005 A       8/1976
WO       2011/145388 A1      11/2011

OTHER PUBLICATIONS

International Search Report and Written Opinion under date of mailing of Aug. 20, 2012 in connection with PCT/GB2011/052340.

*Primary Examiner* — Matthew W Jellett
(74) *Attorney, Agent, or Firm* — Michael Best & Friedrich LLP

(57) ABSTRACT

A valve actuator torque limiter (103) includes a moveable shaft (208) moveable two ways in an axial direction and, in use, rotatable to cause rotation of a valve actuator drive shaft (202). The limiter further includes a brake disc (214) mounted on the moveable shaft; a first friction device (216A) located to a first side of the brake disc, and a second friction device (216B) located to a second side. In use, contact between the brake disc and the first or the second friction device stops a motor (302) rotating the moveable shaft. The limiter also includes a casing (102) housing at least the brake disc, the first friction device and the second friction device, and an adjusting arrangement (224A, 224B) for adjusting a position of the first friction device and/or the second friction device relative to the brake disc. The adjusting arrangement is operable from outside the casing.

15 Claims, 3 Drawing Sheets

(56) References Cited

U.S. PATENT DOCUMENTS

| | | | |
|---|---|---|---|
| 4,373,358 A | 2/1983 | Pearch et al. | |
| 4,570,903 A * | 2/1986 | Crass | F16K 37/0083 251/129.03 |
| 4,947,972 A | 8/1990 | Lea | |
| 5,195,721 A * | 3/1993 | Akkerman | F16D 27/105 192/56.1 |
| 6,978,868 B2 * | 12/2005 | Schautt | B60T 13/741 188/70 B |

* cited by examiner

VALVE ACTUATOR TORQUE LIMITER

CROSS-REFERENCE TO RELATED APPLICATIONS

This application represents the national stage entry of PCT International Application No. PCT/GB2011/052340 filed Nov. 28, 2011, the disclosure of which is hereby incorporated by reference in its entirety for all purposes.

The present invention relates to torque limiters.

The force applied to a motor-driven actuating mechanism, such as a valve actuator, is often controlled by a torque sensing device, in which torque reaction in the actuating mechanism is utilised to disconnect the power to the driving motor once a preset value of torque is reached. A typical motor-driven actuating mechanism may have a worm and wheel, with the wormshaft able to move in an axial direction against springs, the deflection of the shaft being a measure of the torque applied to the wormwheel and actuator output. The resulting deflection may be utilised to switch off an electric motor by means of a torque limit switch and contactor, or disconnect a fluid-powered motor through a suitable valve system. An example of this type of torque limiter is given in GB1446005.

Conventionally, the torque limiter is located on the end of the motor because that is where the worm shaft can be accessed and adapted. However, in some cases, such as valve actuators where a separable motor is employed, the torque limiter cannot be positioned there because there is no access to the motor shaft at the enclosed end of the motor housing. This requires the limiter to be moved inboard and so adjusting it is not easily achievable.

Embodiments of the present invention are intended to address at least some of the issues discussed above.

According to a first aspect of the present invention there is provided a valve actuator torque limiter, the torque limiter including or comprising:

a moveable shaft moveable two ways in an axial direction and, in use, rotatable to cause rotation of a valve actuator drive shaft;

a brake disc mounted on the moveable shaft;

a first friction device located to a first side of the brake disc;

a second friction device located to a second side of the brake disc;

where, in use, contact between the brake disc and the first or the second friction device stops a motor rotating the moveable shaft;

a casing housing at least the brake disc, the first friction device and the second friction device, and an adjusting arrangement for adjusting a position of the first friction device and/or the second friction device relative to the brake disc, wherein the adjusting arrangement is operable from outside the casing.

The first and/or the second friction device may comprise a friction disc having a gear. The adjusting arrangement may include a worm drive gear associated with the gear of the first and/or the second friction disc. The worm drive gear may comprise an elongate member having a threaded portion that, in use, engages its associated gear. A portion of the worm drive gear may protrude through an aperture in the casing. The protruding portion can include a slot or the like to assist with adjustment using a tool, such as a screwdriver. A locking device may be provided adjacent an external end of the worm drive gear. In some embodiments, there are two worm drive gears, one associated with the first friction disc and another associated with the second friction disc.

The adjustment arrangement may be accessible through the casing, in use, at a location between the motor and the drive shaft.

The moveable shaft may comprise a worm shaft that, in use, engages with a worm gear on the drive shaft.

The casing may at least partially house the moveable shaft. The casing may include: a first casing component for, in use, housing a motor; a second casing component for housing parts of the torque limiter; a third casing component for housing parts of the torque limiter and, in use, the drive shaft.

According to another aspect of the invention there is provided a valve actuator including or comprising:
a drive shaft for opening/closing a valve;
a motor for rotating the drive shaft, and
a torque limiter substantially as described herein.

The casing may at least partially house components of the valve actuator as well as components of the torque limiter.

According to yet another aspect of the invention there is provided a valve assembly including a valve and a valve actuator substantially as described herein. The valve assembly may include a second stage gearbox.

The invention extends to any feature, or any combination of features described herein, whether or not that combination is explicitly described herein.

The invention can be put into effect in numerous ways, one example only being described and illustrated with reference to the drawings, wherein.

Figure 1:
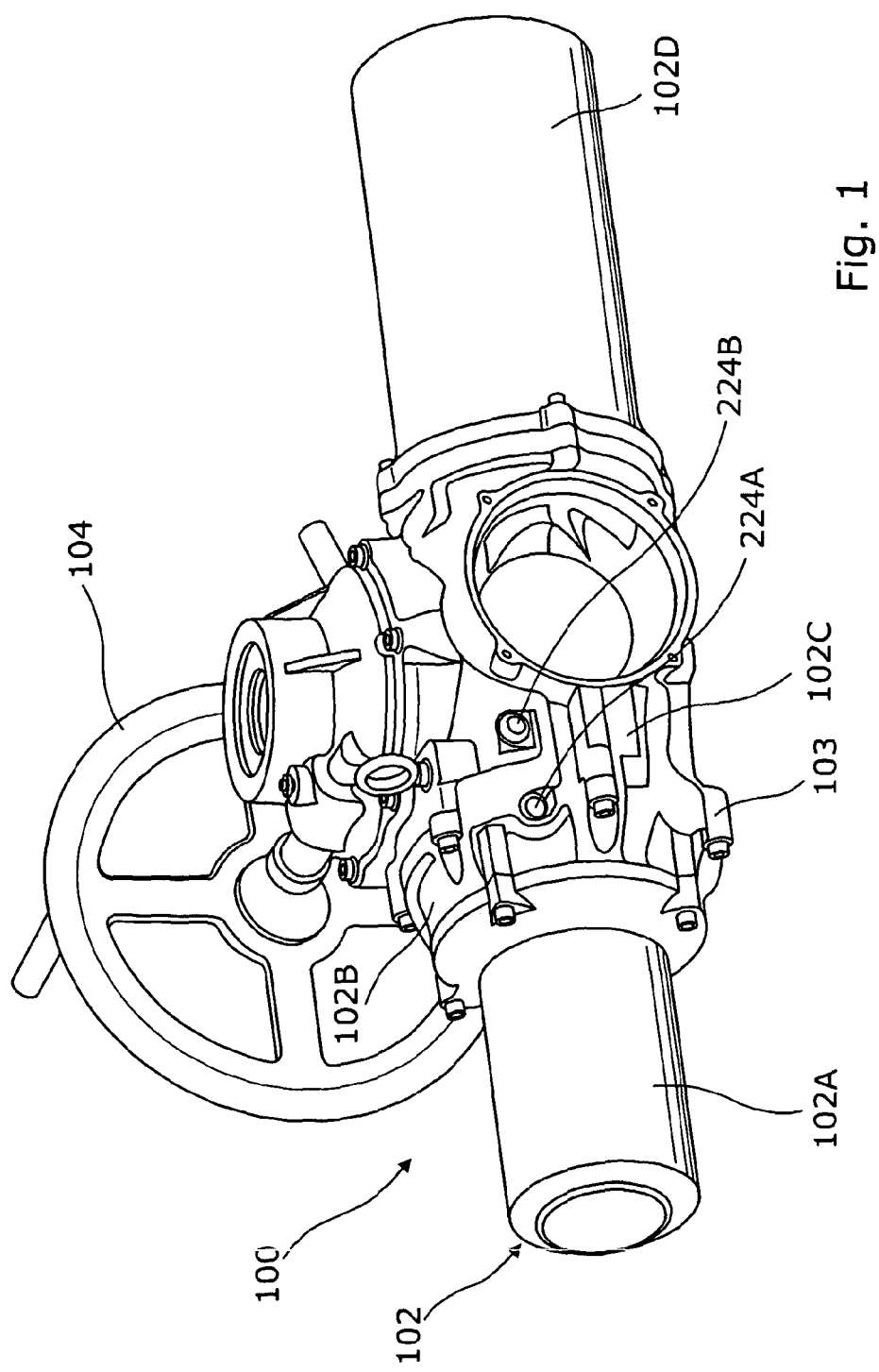
FIG. 1 shows an external view of part of a valve actuator including a torque limiter.

Referring to FIG. 1, parts of a valve actuator, generally shown at 100, are illustrated. The valve actuator can be any suitable device, such as the actuators available from Rotork PLC, of Bath, United Kingdom, and will typically include a handwheel 104 that can be used to manually adjust the position of the drive shaft 203 instead of the motor. The valve actuator includes casing 102, which in the example is formed of several components (but in alternative versions could be one piece) fitted together by any suitable means, e.g. nuts/bolts, welding, etc. These include: casing component 102A for housing a motor (not visible in FIG. 1); casing component 102B for housing parts of a torque limiter (shown generally at 103), and casing component 102C for housing parts of the torque limiter and the drive shaft of the actuator, which will be described below. There is also a further piece of casing 102D that contains a switching mechanism for the valve assembly. The design, dimensions and material(s) used for the casing can vary, but will typically be formed of robust material, such as cast iron, aluminium or hardened steel. In the example described herein, the torque limiter is integrally built into the body of the actuator, but it will be understood that in alternative embodiments, it could be a separate module that is fitted to a pre-formed actuator, for example.

Figure 2:
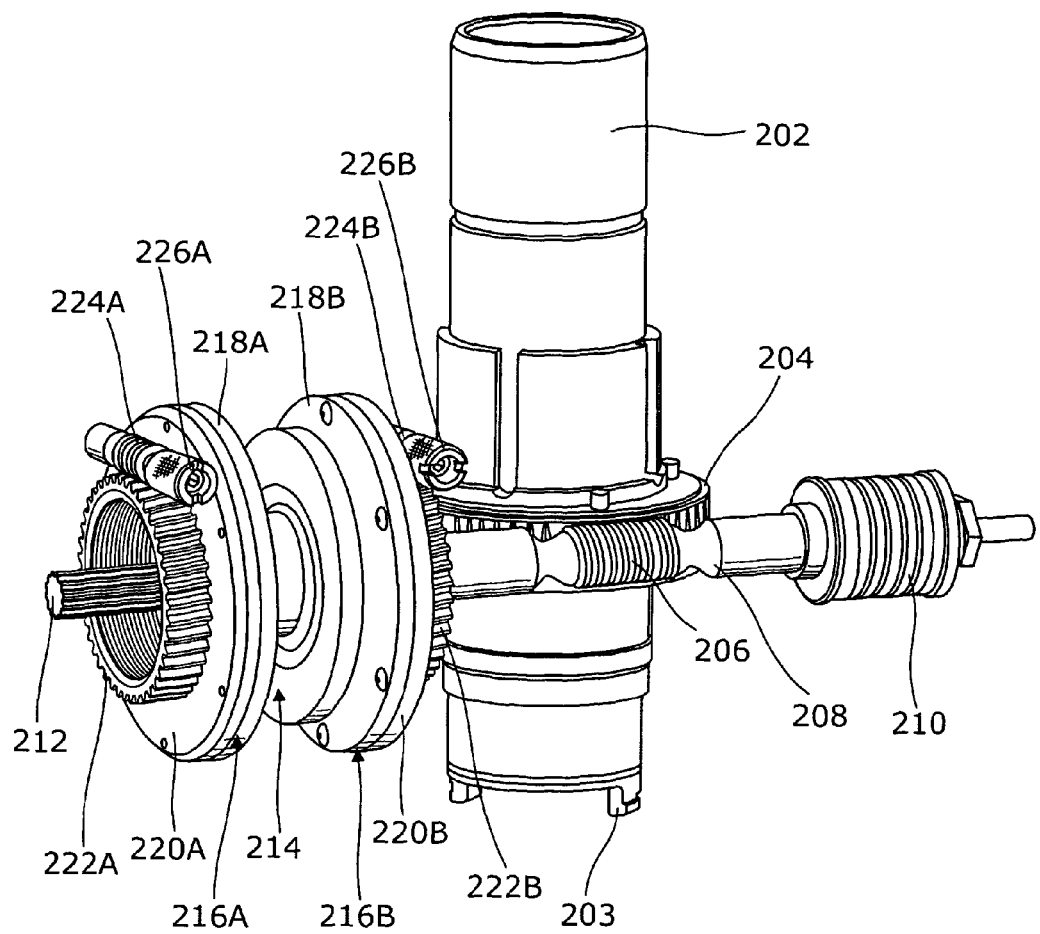
FIG. 2 shows a drive shaft of the valve actuator and components of the torque limiter.

FIG. 2 shows the drive shaft 202 of the valve actuator, which includes a final drive 203, along with parts of the torque limiter. The shaft is fitted with a worm gear 204 that engages with a threaded section 206 of a worm shaft 208. Thus, rotation of the worm shaft around a horizontal axis (in the Figure) results in rotation of the drive shaft around a vertical axis, with clockwise and anti-clockwise rotation of the drive shaft corresponding to closed and open positions, respectively, of the valve in the example. A second stage gearbox may also be included in some versions of the assembly, between the actuator and the valve. Fitted towards the right-hand of the worm shaft is a spring pack 210 that allows axial movement of the worm shaft in response to torque being generated through the worm gear 204 to the drive shaft 202. Some components of the torque limiter described herein, such as the spring pack 210, correspond to those found in the AT, NAT1,NAT5, NAT1E, NAT5E actuator ranges available from Rotork PLC.

Figure 3:
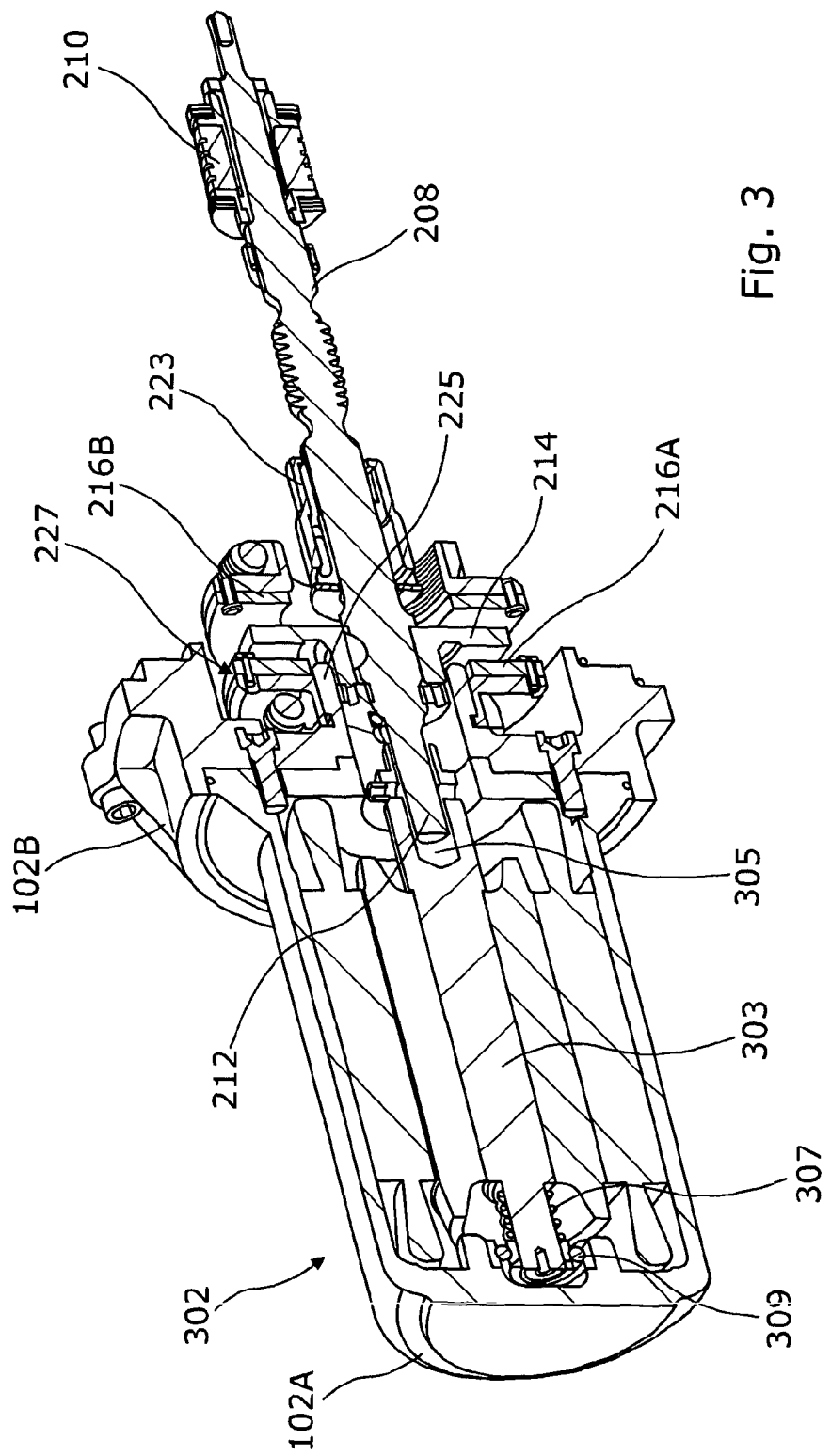
FIG. 3 is a sectional view through components of the torque limiter.

Referring now to FIG. 3 in addition to FIG. 2, the left-hand end of the worm shaft 208 is in communication with a motor 302 via a sliding coupling 212. The motor includes a central shaft 303, one end of which includes a cavity 305 adapted for receiving the sliding coupling. The other end of the shaft is passes through a spring 307 to a bearing 309. The connection between the central motor shaft 307 and the wormshaft 208 is a sliding coupling that allows the wormshaft to move axially in relation to the fixed central motor shaft. A brake disc 214 is mounted on the worm shaft, generally at a position between the drive shaft 202 and the motor casing 102A. A first friction disc 216A is located to the left-hand side of the brake disc, and a second friction disc 216B is located to the right-hand side of the brake disc. Each friction disc has a high-friction surface 218A, 218B (formed of a composite temperature stable rigid moulded friction material) that can engage with the brake disc. Each high-friction surface is fixed onto a rigid disc 220A, 220B. Extending out of the face of each rigid disc that is not in contact with the associated high-friction surface is an outer gear wheel 222A, 222B.

As best seen in FIG. 3, the left-hand friction disc 216A is mounted on a threaded cylindrical inner portion 225 of the casing component 102B, allowing it to move axially within a generally ring-shaped cavity 227 within the casing component (when rotated by the adjustment worm 224B described below). The right-hand disc 216B is mounted in a similar arrangement (not shown) of the casing component 102C.

As best seen in FIG. 2, each outer gear wheel 222A, 222B has an associated worm drive gear 224A, 224B that is an elongate member having a threaded portion that, in use, engages with its outer gear wheel. The length of each worm drive gear is such that a portion of it protrudes through an aperture in the casing 102, as shown in FIG. 1. The other end of the worm drive gear can be supported by a bearing inside the casing. The end of the protruding portion can include a slot or the like to allow the worm gear to be rotatably adjusted easily, e.g. using a tool, such as a screwdriver. It will be appreciated that other arrangements for adjusting the position of the friction discs 216A, 216B can be used, e.g. a ratchet-type mechanism. An indented locking device 226A, 226B may also be provided adjacent the external end of each worm drive gear to give a positive location of the adjusting worms 224A, 224B.

In use, axial movement of the worm shaft 208, under the control of the motor 302, and the brake disc 214 mounted upon can result in either contact with the open direction friction disc 216A, or the closed direction friction disc 216B, generating a braking effect. The axial displacement of the worm shaft is directly related to the torque delivered by the drive shaft 202 and so the maximum torque delivered by the drive shaft can be adjusted externally by means of the individual worm gear drive arrangements 224A, 224B (i.e. one for open torque and one for the closed torque). Rotating the worm gear drive arrangements will cause the associated friction disc 216A, 216B to rotate and move axially via the outer gear wheels 222A, 222B, repositioning them in relation to the brake disc 214. Using a suitable output torque measuring system, the torque limiter can be adjusted by worm gear drive arrangements 224A, 224B to limit the maximum torque delivered under any operating conditions to application specific values.

When the friction discs 216A, 216B are positioned closely to the brake disc 214, only a small axial displacement is required to generate the braking effect, thus limiting the torque available at the drive shaft 202 to a minimum. Conversely, the friction discs may be positioned further away from the brake disc so as to have no braking effect, thus enabling a wide range of adjustment of maximum torque generated by the drive shaft of the actuator. The worm drive gears can be of a gear ratio that is non-reversible and their locking devices 226A, 226B can help ensure creep in the position of the friction discs does not occur.

By having the adjustment devices located inboard of the motor, the torque limiter described herein can provide benefits in terms of sizing, whereby because the maximum torque capabilities of the actuator is guaranteed, the stresses on the valve are reduced allowing valve designers to choose appropriate materials. Thus, the torque limiter can result in reduced costs, whilst still meeting or exceeding basic safety requirements. It will be appreciated that the torque limiter can be used with various types of valve actuators, as well as other types of motor-driven actuating mechanisms.

We claim:

1. A valve actuator torque limiter including:
    a moveable shaft moveable two ways in an axial direction and, rotatable to cause rotation of a valve actuator drive shaft;
    a brake disc mounted on the moveable shaft;
    a first friction device located to a first side of the brake disc and including an outer gear wheel;
    a second friction device located to a second side of the brake disc;
    wherein contact between the brake disc and the first or the second friction device stops a motor rotating the moveable shaft;
    a casing housing at least the brake disc, the first friction device and the second friction device, and
    an adjusting arrangement for adjusting a position of the first friction device relative to the brake disc, wherein the adjusting arrangement includes a worm drive gear rotatable from outside the casing, the worm drive gear engaged with the outer gear wheel to rotate the first friction device.

2. A torque limiter according to claim 1, wherein the second friction device comprise a friction disc having a second outer gear wheel.

3. A torque limiter according to claim 2, wherein the adjusting arrangement includes a second worm drive gear associated with the second outer gear wheel of the second friction disc.

4. A torque limiter according to claim 3, wherein the second worm drive gear comprises an elongate member having a threaded portion that engages the second outer gear wheel.

5. A torque limiter according to claim 1, wherein a portion of the worm drive gear protrudes through an aperture in the casing.

6. A torque limiter according to claim 5, wherein the protruding portion includes a slot to assist with adjustment of the worm drive gear using a tool.

7. A torque limiter according claim 5, wherein a locking device is provided adjacent an external end of the worm drive gear.

8. A torque limiter according to any one of claims 3 to 7, wherein the adjustment arrangement is accessible through the casing at a location between the motor and the drive shaft.

9. A torque limiter according to claim 1, wherein the moveable shaft comprises a worm shaft that engages with a worm gear on the drive shaft.

10. A torque limiter according to claim 1, wherein the casing at least partially houses the moveable shaft.

11. A torque limiter according to claim 1, wherein the casing includes a first casing component for housing a motor; a second casing component for housing parts of the torque limiter; a third casing component for housing parts of the torque limiter and the drive shaft.

12. A valve actuator including:
   a drive shaft for opening/closing a valve;
   the motor for rotating the drive shaft, and
   a torque limiter according to claim 1.

13. A valve actuator according to claim 12, wherein the casing at least partially houses components of the valve actuator as well as components of the torque limiter.

14. A valve assembly including a valve and a valve actuator according to claim 12.

15. A torque limiter according to claim 1, wherein adjustment of the adjusting member is performed using a tool disposed outside of the casing.

* * * * *